Sept. 9, 1969   G. S. PULSKAMP ET AL   3,465,841
REVERSIBLE ELECTRIC MOTOR SPEED CONTROL
Filed Oct. 11, 1967   2 Sheets-Sheet 1
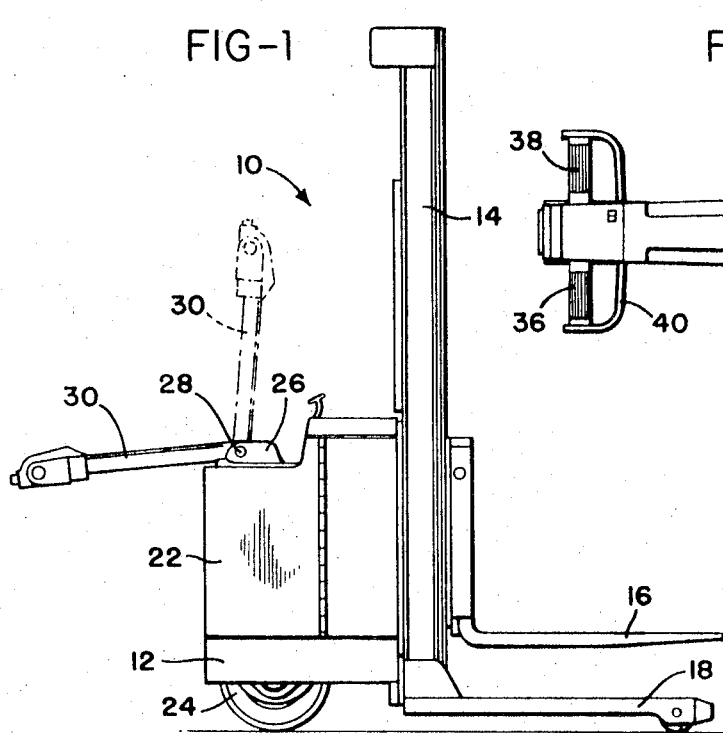
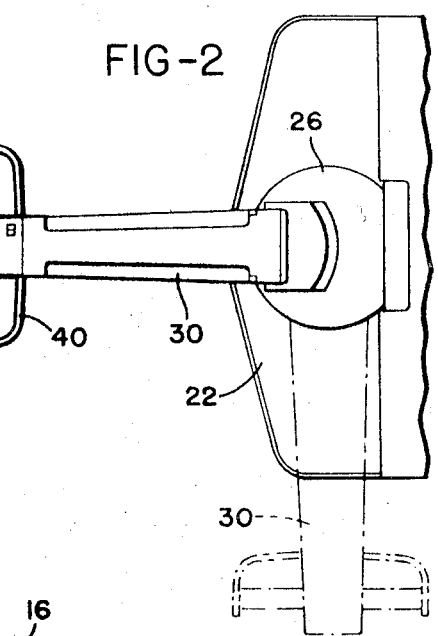
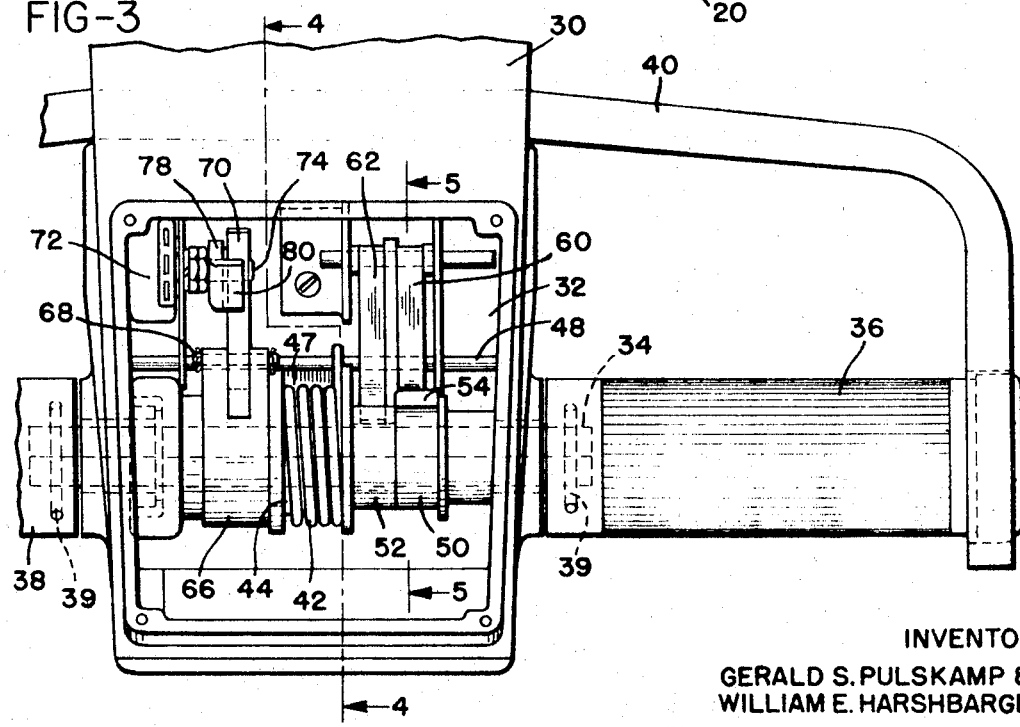
INVENTORS
GERALD S. PULSKAMP &
WILLIAM E. HARSHBARGER
BY
Marechal, Biebel, French & Bugg
ATTORNEYS Sept. 9, 1969 G. S. PULSKAMP ET AL 3,465,841
REVERSIBLE ELECTRIC MOTOR SPEED CONTROL
Filed Oct. 11, 1967 2 Sheets-Sheet 2
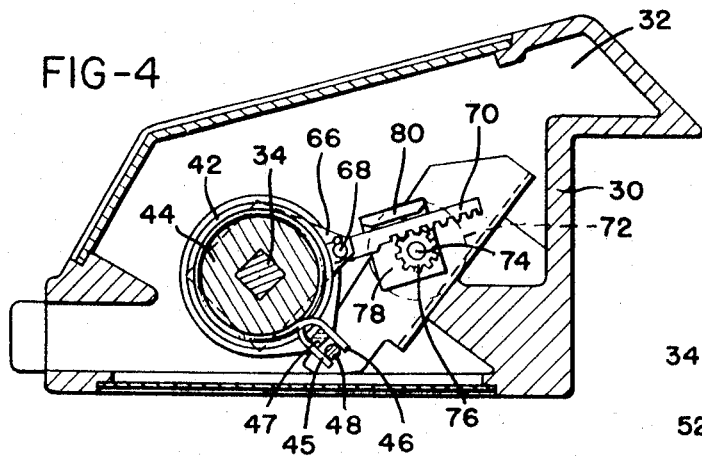
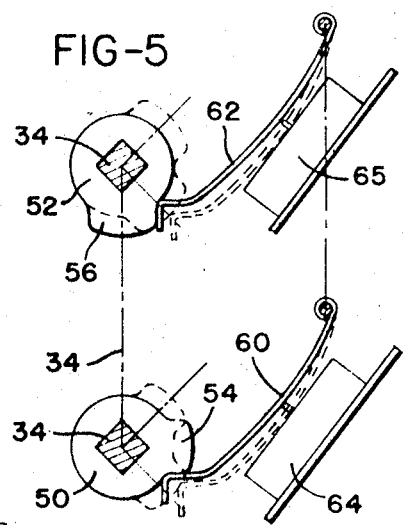
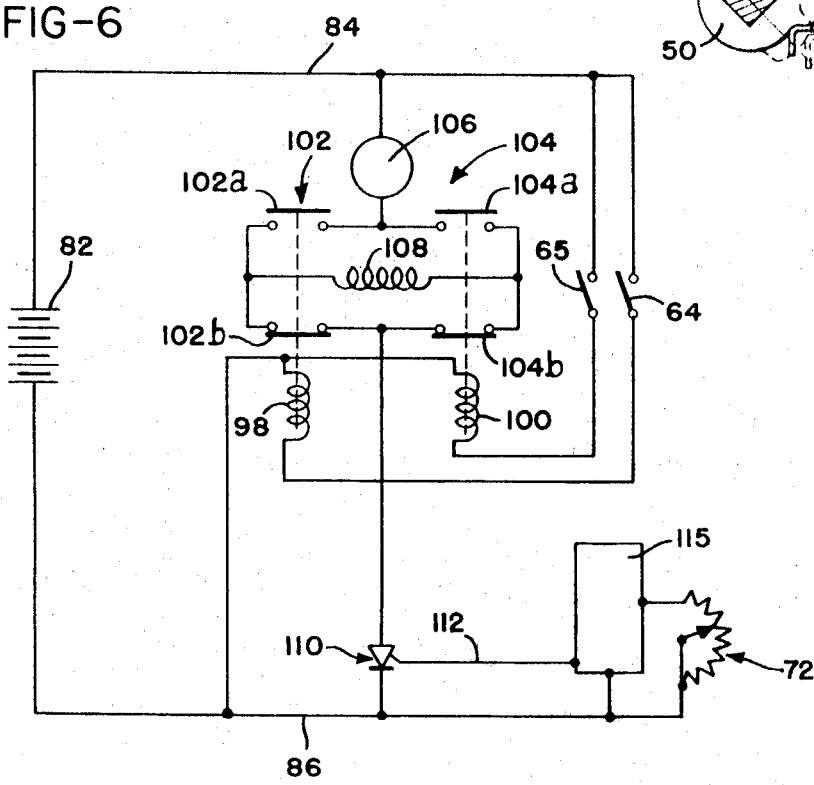

United States Patent Office 3,465,841
Patented Sept. 9, 1969

3,465,841
REVERSIBLE ELECTRIC MOTOR SPEED CONTROL
Gerald S. Pulskamp, New Bremen, and William E. Harshbarger, Anna, Ohio, assignors to Crown Controls Corporation, New Bremen, Ohio, a corporation of Ohio
Filed Oct. 11, 1967, Ser. No. 674,485
Int. Cl. B60k 1/04; B62d 51/04
U.S. Cl. 180—65                          6 Claims

ABSTRACT OF THE DISCLOSURE

A vehicle incorporates a reversible variable speed electric motor and a control including control grip structure wherein rotation of the grip actuates a speed control with a non-linear relationship between grip rotation and control of the speed control means. Initial rotation of the control grip moves the speed control only slightly so that fine speed control in the lower speed ranges is assured. The grip always operates the speed control in the same direction although the handle can rotate from a dead center or neutral position in either direction for reversal control.

Background of the invention

This invention is directed to speed control for a reversible electric motor, for example as used for self-propelled electric industrial vehicles where an operator walks with or rides on the vehicle and guides and controls its speed and braking, such as self-propelled industrial trucks, pallet trucks and lift trucks.

The prior art abounds with self-propelled industrial trucks wherein the operator guides and controls the vehicle, and some of these trucks have the speed of the vehicle controlled by a rotatable control grip on a steering tiller. These prior constructions use separate speed control devices operated by the grip for the two directions of motion of the vehicle, because in previous designs a control means (such as a conventional potentiometer) could not be rotated in the same direction from a minimum speed position to a higher speed position while the grip was able to rotate in either direction from its central zero position.

Summary of the invention

Speed and directional control of reversible electric motors, such as used to power hoists or to propel industrial vehicles and the like, is accomplished by a single rotatable grip and solid state power control. Directional and speed control is accomplished by a grip which is rotatable in either of two directions from a neutral position. These directions control the direction of motion of the truck, while the amount of rotation of the grip handle from the neutral position controls the speed of the motor. The grip rotation is translated to the control means which actually controls speed by means of a crank mechanism which is related to the grip in such a way that the crank is on dead center (i.e., neutral) when the control grip is located at its zero speed or neutral position. The crank is connected by rack and pinion structure to a conventional potentiometer so that the potentiometer has a rotative relationship to the control handle which is preferably non-linear, and the potentiometer operates in the same rotative direction for either rotative direction of the control grip. This provides for accurate control of the potentiometer at slight rotations of the control handle for closer control of motor speed in the lower ranges, where delicate control is most needed. Furthermore, the single rotative direction of the potentiometer permits it to be more readily connected into a conventional motor speed control circuit.

It is the object of this invention to provide an improved control for a reversible electric motor wherein rotation of a control grip in either direction from a neutral position causes movement of a control means in only one direction so that the control means can signal speed independent of the direction of rotation of the grip; to provide a novel and simplified control handle with control means that also controls direction of motion of a motor which may drive a vehicle; and to provide such a control means which is highly reliable and maintenance free so as to provide prolonged, economic service life. Other objects and advantages of this invention will become apparent from the following specification, claims and the attached drawings.

Brief description of the drawings

FIG. 1 is a side elevational view of an electric industrial truck which is self-propelled and guided by a walking operator, incorporating the control means of this invention;

FIG. 2 is an enlarged top view of the guidance tiller structure, showing in dotted lines the steering motion of the handle to one side;

FIG. 3 is an enlarged top view of the outer portion of the tiller, with parts broken away, showing a portion of the internal structure;

FIG. 4 is a section taken generally along line 4—4 of FIG. 3;

FIG. 5 is a section taken generally along line 5—5 of FIG. 3; and

FIG. 6 is a schematic electric circuit diagram showing the motive power and speed control and other related circuitry of the vehicle.

In FIG. 1 an industrial electric lift truck having the control means of the invention is generally indicated at 10 as a typical application of the preferred embodiment. Lift truck 10 has a main frame 12 upon which is mounted mast 14. Vertically movable on the mast are a pair of forks, one of which is indicated at 16. The forks may be moved up and down the mast by convention power structure incorporated within the lift truck. For example, a motor driven pump and associated hydraulic lift can be used. The forward end of frame 12 carries supports 18, one on each side of the lift truck, and the forward end of each support may have a wheel 20 thereon.

The rear end of frame 12 carries a motor mounting within a housing 22. This housing is rotatable on a vertical axis with respect to frame 12 and carries at its lower end a traction wheel 24. The three described wheels support the lift truck 10 and the steerability of wheel 24 provides for steering of the lift trucks. A reversible electric propulsion motor on the motor post is connected through a conventional speed reduction to drive wheel 24 for propulsion of the truck. Batteries and controls are provided within housing 22 for the powering and control of the motor. The upper end of the motor post extends out of the top of housing 22 and terminates in cap 26. Pivoted to cap 26, by means of pin 28, is tiller 30. Lateral manual control of tiller 30 controls the rotation of the motor post upon its vertical axis to steer the truck.

Since the tiller 30 steers the truck, it is a convenient location for placement of the controls for the direction of speed and propulsion of the truck, especially in a walking truck as shown. Obviously in other forms of vehicles, or in other equipment, the controls will be similarly conveniently located. The outer end of tiller 30 has a chamber 32 therein which is arranged to contain the equipment for converting mechanical movement to electric signals. Shaft 34 extends through chamber 32 and extends out of each side thereof. It is rotatable in the sidewalls of tiller 30 which form the chamber. Control grips 36 and 38 are secured to shaft 34 through cross pins 39 so that rotation of either rotates the shaft. The outer ends of grips 36 and 38 are rotatably supported in yoke 40 which forms part of the outer end of the tiller. Thus, the operator can steer the truck 10 by grasping either or both of the grips 36 and 38, and at the same time rotating the grips. Rotation of the grips is arranged to control the direction and speed of propulsion by means of the structures described below.

As is seen in FIGS. 3 and 4, a torsion spring 42 encircles spring holder 44 which is fixed to shaft 34. The ends of the spring have substantially radially outwardly extending fingers 45 and 46 which embrace a transverse arm 47 of the holder 44, and also extend beyond the arm and around a cross pin 48 fixed to the tiller 30 within the chamber. The spring is thus arranged to return grips 36 and 38, as well as shaft 34, to a neutral or center position as shown. Rotating a grip and the shaft will rotate the holder, and arm 47 pushes against one of the fingers while the other engages pin 48. The action is reversible and the farther the grips the greater the spring resistance.

In FIGS. 3 and 5, direction control cams 50 and 52 are mounted upon shaft 34 to rotate with it. Cam 50 has a control lobe 54, and cam 52 has a control lobe 56, each of which is arranged to move corresponding leaf spring followers 60 and 62, respectively. These followers in turn control normally open switches 64 and 65 which are in the control circuit (FIG. 6).

When shaft 34 is rotated clockwise as (viewed in FIG. 4) toward its forward position, the cam lobe 54 closes forward switch 64, and conversely with counterclockwise rotation of shaft 34 from the neutral position, the cam lobe 56 closes reverse switch 65.

Also mounted on shaft 34, and rotated by it, is crank 66. A crank pin 68 connects this crank to a link embodying a rack 70. A conventional single wound potentiometer 72 is carried by a bracket secured within chamber 32, and the potentiometer shaft 74 extends through the bracket. The outer end of shaft 74 carries a drive pinion 76. Rack 70 is engaged with pinion 76, and a guide 78 is freely rotatively mounted upon shaft 74 and has a guide flange 80 which extends over the back of rack 70, thus maintaining the gear tooth engagement between the rack and pinion.

The orientation of these parts and the cams is such that in the neutral position of shaft 34, both switches are open and crank 68 is in its outer dead center position. Thus, as is seen in FIG. 4, in its neutral position the potentiometer 72 is turned in its most clockwise position. Rotation of shaft 34 in either direction by means of grips 36 and 38 causes rotation of the potentiometer 72 in a counterclockwise direction. Potentiometer 72 is connected into the electric circuit to provide a variable control voltage in such a manner that in the dead center position shown in FIG. 4, the propulsion motor is at rest. As the potentiometer 72 rotates in a counterclockwise direction, it controls the circuit such that the propulsion motor gradually increases its speed.

FIG. 6 shows the schematic diagram of a typical embodiment of the electric propulsion control circuit for the lift truck 10. Batteries serve as the conventional power source, hence a battery supply source is indicated at 82, supplying power to lines 84 and 86. The lift controls are eliminated since they are not pertinent here.

Switches 64 and 65 are respectively connected to control energizing of coils 98 and 100 of forward and reverse relays 102 and 104. The propulsion motor referred to above has an armature 106 which is connected to line 84 and alternatively through one or the other of relays 102 and 104. Furthermore, the series field coil 108 is connected between the contacts of relays 102 and 104 in such a manner that energization of one relay causes connection of series field 108 in one direction with respect to armature 106, through relay contacts 102a and 104b, while energization of the other relay causes opposite connection of the field with respect to the armature, through contacts 104a and 102b. This causes opposite rotation of the armature. It is thus seen that closure of switch 64 causes energization of coil 98 and actuation of forward relay 102, connecting the motor to run in a forward direction. On the other hand, closing switch 65 energizes coil 100 and actuates relay 104 to cause the motor to run in the reverse direction.

The relay contacts 102b and 104b are both connected to an SCR 110, and the other side of the SCR is connected to the power supply line 86. The control lead of the SCR is connected through line 112 to a conventional firing control circuit 115. Details of this circuit are omitted because they are conventional and may take different form depending upon the supplier. A typical circuit is available from General Electric Company and is fully described in publications of that company.

The potentiometer 72 is connected between power supply line 86 and the control circuit, to provide a variable control voltage which in turn controls the switching rate of the firing and control circuit, which in turn controls the main power SCR 110. Motor speed is thus controlled by changing the frequency at which the SCR is triggered on, and in the usual type of control the on time of the SCR is constant.

Increasing counterclockwise rotation of potentiometer 72 from its neutral position shown in FIG. 4 causes progressively increasing rotative speed of motor armature 106 and thus increases the speed of propulsion of truck 10. In view of the crank type connection of rack 72 to shaft 34, the rotational speeds of shaft 34 and potentiometer shaft 74 are not in direct ratio, but have a sinusoidal relationship. The initial angular motion of shaft 34 from the neutral position shown in FIG. 4 causes a relatively small rotation of potentiometer 72. However, a similar rotative motion of shaft 34 near its maximum rotative position turns the potentiometer 72 a relatively greater amount. Furthermore, rotation of shaft 34 in either direction from neutral, and through the same angular amount, turns the potentiometer 72 always in the same direction and by the same amount.

The control circuit 115 and its immediately associated circuitry is concerned only with speed, while relays 102 and 104 of their control switches 62 and 64 control only direction of rotation. This simplifies the control circuit, makes it more reliable, and produces the speeds in opposite directions substantially equal for the same amount of grip rotation in opposite directions.

While the form of apparatus herein described constitutes a preferred embodiment of the invention, it is to be understood that the invention is not limited to this precise form of apparatus, and that changes may be made therein without departing from the scope of the invention.

What is claimed is:

1. In an electrically propelled vehicle having an electric propulsion motor, control means on said vehicle for controlling said propulsion motor, said control means including switches for controlling direction of rotation of said propulsion motor and a potentiometer for providing a variable signal to control the speed of rotation of said propulsion motor, the improvement comprising
   manual control means including a rotatable grip,
   means urging said grip to a neutral position from which said grip can rotate in opposite directions,
   means operable for rotation of said grip in opposite directions to actuate said switches for producing rotation of said propulsion motor selectively in forward or reverse direction,
   a crank connected to said grip and located substantially in a dead center position when said grip is in its said neutral position,
   and mechanism connecting said crank to said potentiometer to cause progressive motion of said potentiometer in the same direction regardless of the direction of rotation of said grip whereby progressively increasing motor speed is achieved in both forward and reverse directions by continued rotation of said grip from its neutral position.

2. The control of claim 1 wherein a rack is pivotedly connected to said crank, a shaft on said potentiometer, a pinion mounted to rotate said potentiometer shaft, and means holding said rack in engagement with said pinion such that rotation of said grip in either direction from neutral position causes rotation of said potentiometer shaft always in the first direction.

3. The control of claim 2, including a torsion spring connected to said rotary grip and arranged to urge said grip to a neutral position at the dead center position of said crank.

4. Apparatus as defined in claim 1, said vehicle including a tiller connected to steer the vehicle, and a housing incorporated in said tiller providing a mounting for said manual control means.

5. In a speed control for a reversible electric motor, the combination of
a control unit operable to vary the electrical power supplied to said motor and also incorporating direction switch means for selective forward and reverse operation,
said speed control unit incorporating a rotatable potentiometer having a control shaft,
a pinion fixed to said control shaft,
a manually operable rotatable grip arranged for rotation in either direction from a neutral position,
linkage means including a crank rotatable with said grip and located substantially in an outer dead center position with said grip in its neutral position and a link connected to said crank for adjusting said potentiometer,
a rack incorporated in said link,
a bracket arranged to hold said rack engaged with said pinion throughout the limits of movement of said crank and said link,
and a connection between said grip and said switch means arranged to produce forward or reverse operation thereof in response to corresponding rotational movement of said grip in opposite directions from its neutral position.

6. A speed control as defined in claim 5, including a torsion spring connected to center said grip at the neutral position and to resist rotation of said grip in opposite directions with a substantially equal force.

References Cited

UNITED STATES PATENTS

| | | | |
|---|---|---|---|
| 3,168,157 | 2/1965 | Ulinski | 180—65 |
| 3,179,198 | 4/1965 | Hastings | 180—65 |
| 3,300,612 | 1/1967 | Quayle | 200—157 |
| 3,362,497 | 1/1968 | Nichols | 180—65 X |

FOREIGN PATENTS 619,777  3/1949  Great Britain.

BENJAMIN HERSH, Primary Examiner

MILTON L. SMITH, Assistant Examiner

U.S. Cl. X.R.

180—19; 200—157, 61.55; 338—78